United States Patent [19]

Moody

[11] Patent Number: 5,152,167
[45] Date of Patent: Oct. 6, 1992

[54] METHOD AND APPARATUS FOR MEASURING LEAKAGE IN A FLUID SYSTEM

[75] Inventor: John K. Moody, Brandon, Fla.

[73] Assignee: Colman Manufacturing Company, Tampa, Fla.

[21] Appl. No.: 653,665

[22] Filed: Feb. 8, 1991

[51] Int. Cl.⁵ .............................. G01M 3/04
[52] U.S. Cl. ................... 73/40; 73/40.5 R
[58] Field of Search ........... 73/40, 49.2, 40.5 R, 73/37

[56] References Cited

U.S. PATENT DOCUMENTS

| | | | |
|---|---|---|---|
| 2,493,967 | 1/1950 | Hendricks | 73/40 |
| 2,684,590 | 7/1954 | Lassman . | |
| 2,705,888 | 4/1955 | Sedgwick . | |
| 2,883,859 | 4/1959 | Merrill . | |
| 3,312,103 | 4/1967 | Goeke . | |
| 3,362,225 | 1/1968 | Noble . | |
| 3,910,102 | 10/1975 | McLean | 73/40.5 R |
| 3,958,449 | 5/1976 | Drescher et al. | 73/40.5 R |
| 3,978,709 | 9/1976 | Ando | 73/40.5 R |
| 4,103,537 | 8/1978 | Victor . | |
| 4,269,061 | 5/1981 | Hatsuno et al. | 73/40 |
| 4,320,653 | 3/1982 | Bernhardt et al. | 73/40 |
| 4,549,429 | 10/1985 | Kurt | 73/40 |
| 4,715,214 | 12/1987 | Tveter et al. | 73/40 |
| 4,928,528 | 5/1990 | Marques | 73/40 |

FOREIGN PATENT DOCUMENTS

| | | | |
|---|---|---|---|
| 727565 | 11/1942 | Fed. Rep. of Germany | 73/37 |
| 1147937 | 3/1985 | U.S.S.R. | 73/49.2 |

*Primary Examiner*—Hezron E. Williams
*Assistant Examiner*—George M. Dombroske
*Attorney, Agent, or Firm*—Quarles & Brady

[57] ABSTRACT

Apparatus for measuring fluid leakage in a fluid system includes a fluid pump connected to the fluid system through a regulator valve which allows passage of fluid to the tested system until a pressure limit is reached and then diverts the pump fluid to a reservoir connected to the input of the pump for recirculation. An inlet valve for supplying fluid to the testing apparatus from a fluid source is closed when the system is pressurized, and the reservoir level is recorded. As fluid is lost in the system, fluid from the reservoir recharges the system. After the expiration of a testing period, the drop in reservoir level corresponds to the fluid leakage in the tested system.

20 Claims, 1 Drawing Sheet

METHOD AND APPARATUS FOR MEASURING LEAKAGE IN A FLUID SYSTEM

BACKGROUND OF THE INVENTION

1. Field of the Invention

The present invention relates to fluid system testing apparatus and methods. More particularly, the present invention relates to apparatus and methods for testing fluid systems for leakage.

2. Prior Art

Some prior methods use for testing fluid systems for leakage are described in U.S. Pat. No. 4,013,537 to Victor, the disclosure of which is incorporated by reference herein. In addition to the shortcomings discussed in the Victor disclosure, additional problems exist in the prior systems, including the Victor device and method.

First, for fluid systems having relatively small fluid volumes, the relatively short elapsed time of the typical "pressure drop per time" test period makes it difficult to obtain accurate measurements of leakage quantity. Additionally, smaller fluid volume increases the significance of the concurrent leakage during the testing period. Other drawbacks of prior fluid testing methods include the inaccuracies created by a defective or nonprecision pressure gauge and operator error in manually reducing the system fluid pressure to equal the pressure measured during the timing phase of the testing procedure.

In some previous leakage testing methods, the system fluid is set to a predetermined pressure, and measurements are made after the fluid pressure has dropped to a lower level. These methods typically require the use of fluctuating pressure to obtain leakage measurements. Accordingly, leakage measurements are made relative to an average fluid pressure. Because the quantity of fluid passing through a leakage orifice decreases as the fluid pressure decreases, further inaccuracies in the leakage quantity measurement are introduced.

SUMMARY OF INVENTION

It is an object of the invention to provide apparatus and methods for measuring leakage in a fluid system without the inaccuracies attendant to previous systems.

It is another object of the invention to provide apparatus and methods for measuring fluid system leakage both hydrostatically and hydrodynamically.

It is a further object of the invention to provide apparatus and methods for accurately measuring leakage in a fluid system having a relatively small volume of fluid.

It is yet another object of the invention to eliminate inaccuracies in measuring fluid system leakage caused by manual pressure reduction to duplicate pressure loss in the fluid system.

It is still another object of the invention to avoid inaccuracies in measuring leakage in a fluid system caused by concurrent leakage during a testing period.

These and other objects of the invention are achieved by testing apparatus having a pump for charging a fluid system to a predetermined pressure limit, connected in parallel with a fluid reservoir. The outlet of the pump is connected to a regulator valve having a first system outlet connected to the tested system and a second bypass outlet connected to the fluid reservoir. When the predetermined pressure is reached in the tested system, the regulator valve releases additional fluid from the pump to the reservoir through the bypass outlet.

The reservoir is connected by a second conduit to the inlet of the pump, forming a reservoir loop. The reservoir fluid is recirculated through the reservoir loop and the pump while the predetermined pressure is maintained in the tested system.

The pressure in the tested system can be monitored by a pressure gauge or similar device connected to the tested system on the system outlet side of the regulator valve. Additionally, a system valve can be provided on the system outlet side of the regulator valve to control fluid flow from the testing apparatus to the tested system.

At least three methods of leakage detection and measurement can be performed with the apparatus of the invention. First, a hydrostatic measurement of fluid leakage volume can be taken. In this first method, the pump charges the tested system with fluid drawn from a fluid source, such as a water main or the like. The regulator valve, which can have a field adjustable or fixed pressure limit, allows passage of the pumped fluid through its system outlet to the tested system until the predetermined pressure limit is reached. Subsequently, additional fluid discharged by the pump is diverted through the bypass outlet of the regulator valve to the fluid reservoir.

The fluid reservoir can be provided with a level indicator, such as a vertical, graduated window, along its side wall. The fluid level in the reservoir can be adjusted to provide a easily readable, starting level on the level indicator. A inlet valve connecting the testing apparatus to the fluid source is closed to fix the volume of fluid present in the testing apparatus and the tested system.

To begin the timed testing period, a system valve connecting the testing apparatus to the tested system and pressure gauge is closed, and the pump can be temporarily deactivated. The pressure drop in the tested system is measured by the pressure gauge during the timed testing period.

Near the end of the timed testing period, the pump is reactivated with the inlet valve remaining closed, thereby recirculating the fluid in the reservoir loop and reaching a steady state operation. The reservoir fluid level is noted and recorded after which the system valve is reopened at the expiration of the timed testing period to allow the pump to recharge the tested system with fluid from the reservoir loop.

When the original pressure limit is again achieved in the tested system, the regulator valve diverts the fluid to the reservoir and recirculation in the reservoir loop recurs. At this stage, the system valve can be closed. The difference between the starting level and the post testing level on the reservoir level indicator corresponds to the volume of fluid lost due to leakage in the tested system during the testing period.

The testing apparatus of the invention also enables a second method of leakage detection and measurement in a hydrodynamic environment. For hydrodynamic leakage measurement, the tested system is charged to the predetermined pressure, and additional fluid is diverted to the reservoir loop, similar to the hydrostatic method above. Once the fluid level indicated on the level indicator is set and noted, the inlet valve is closed, and the timed testing period is started.

In this hydrodynamic method, the system valve remains opened, and the pump continues to operate. A radiator or similar cooling means can be connected to the reservoir loop to dissipate heat generated in the fluid recirculated in the testing apparatus. During the timed testing period, the predetermined pressure for the tested system is maintained, and any fluid leaving the tested system though leakage orifices is automatically replaced by the pump, drawing from the reservoir loop.

At the end of the timed testing period, the lower reservoir fluid level indicated on the level indicator is noted. The difference between the starting level and the post test level corresponds to the volume of fluid lost in the system due to leakage during the timed testing period.

The testing apparatus of the present invention can also be used to detect leakage according a third method. In this method, the pump charges the tested system to a predetermined pressure which is indicated on the tested system pressure gauge. The system valve is closed, and the pressure gauge is monitored during a timed testing period. If a pressure drop is represented on the pressure gauge, fluid loss due to leakage has occurred in the tested system. This preliminary test can be used in conjunction with the hydrostatic method discussed above to avoid the recharging steps and associated quantitative measurements if no leakage is qualitatively detected by the pressure gauge.

BRIEF DESCRIPTION OF THE DRAWINGS

A full understanding of the invention can be gained by a person of ordinary skill in the art to which the invention relates by reading the following detailed description in conjunction with the accompanying drawing in which.

DETAILED DESCRIPTION OF THE PREFERRED EMBODIMENT

Figure 1:
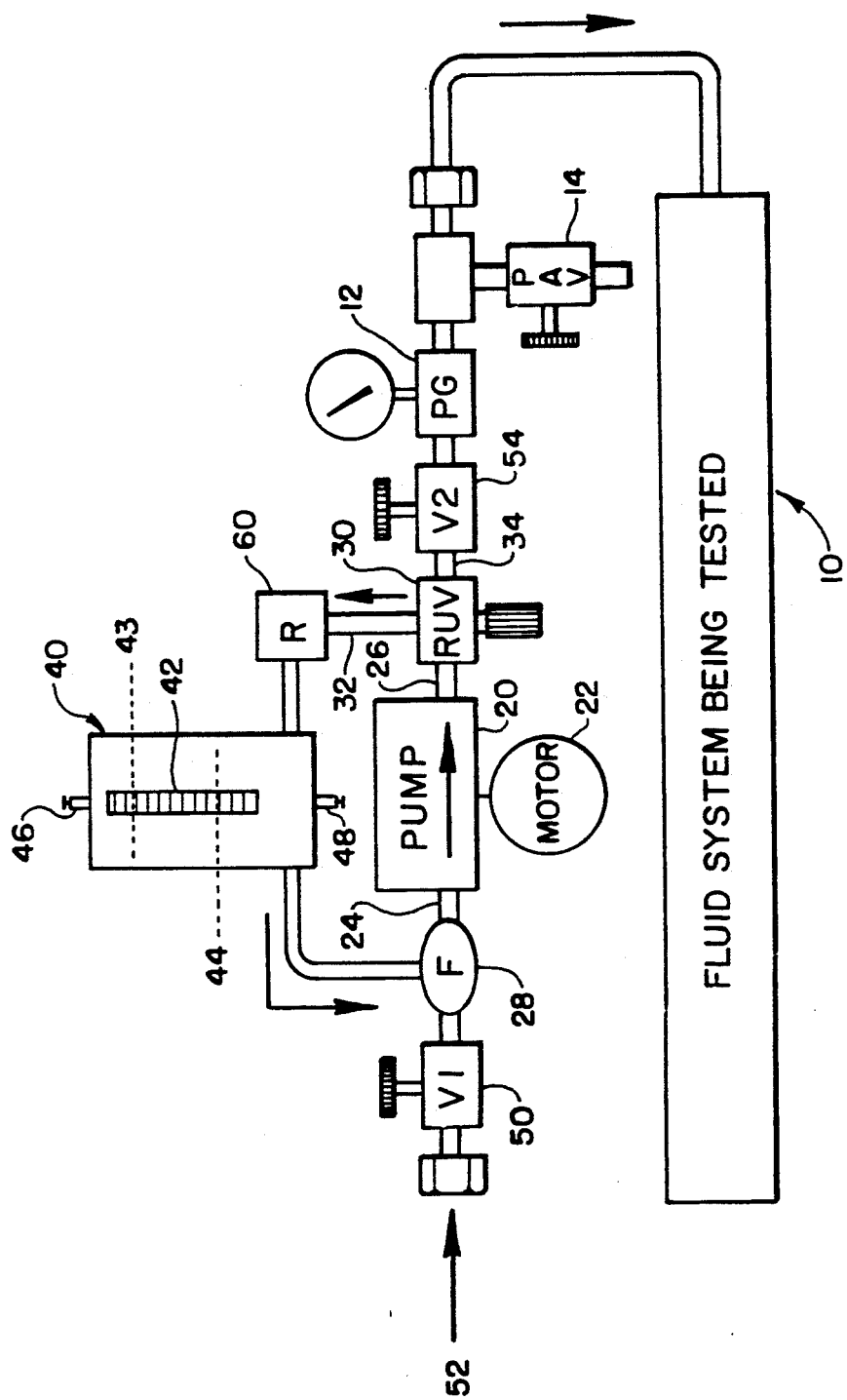
FIG. 1 shows fluid system testing apparatus according to the invention.

Referring to the figure, the invention provides apparatus for qualitatively and quantitatively detecting and measuring fluid loss due to leakage in a fluid system. The fluid system can be tested for leakage both hydrostatically and hydrodynamically. The testing apparatus is adapted to simply detect the presence of leaks in a fluid system. If leaks are detected, the apparatus can be further utilized to measure the fluid volume lost due to leakage during a timed test period.

As referred to throughout the specification, a tested fluid system or tested system means any structure, used for storing or conveying fluids, which is susceptible to structural breaches causing fluid leaks. The tested fluid systems can range from water mains for municipal water supplies to fluid piping used in industrial plant environments. Such fluid systems are well known to those of ordinary skill in the art and are referred to generally in the drawing as tested fluid system 10.

The testing apparatus according to the invention generally including a pump 20 connected in parallel to a fluid reservoir 40 by a regulator valve 30, which controls fluid flow from the pump 20 to the tested system 10 and the fluid reservoir 40. The pump 20 can be driven by a motor 22 or similar power supply. The pump 20 preferably has a pressure and volume capacity to deliver fluid at testing pressure typically 50% greater than the working pressure of the tested system 10.

The regulator valve 30 has a system output 34 and a second, bypass output 32. The regulator valve 30 allows passage of fluid from the pump 20 to the tested system 10 until a predetermined pressure limit is reached in the tested system 10. The regulator valve 30 is set to divert fluid from the pump 20 to the bypass outlet 32 when the predetermined pressure limit is reached. The pressure limit can be fixed in the regulator valve 30 or can be field adjustable according to any of the many methods known in the field of pressure relief valves.

The regulator valve 30 is preferably an unloader type valve having a valve mechanism for shifting the input flow to one of a plurality of outlets dependent on a predetermined pressure. Alternatively, the regulator valve can be pressure relief valve generally known in the art.

A fluid source 52 is connected to the inlet 24 of the pump 20 through an inlet valve 50. Preferably, the junction for connecting the inlet side of the pump 20 to the fluid reservoir 40 is provided with a filter 28 for filtering contaminants from the fluid source 52 and the reservoir 40.

In a preferred hydrodynamic leakage testing method, the tested system 10 is charged with fluid from the fluid source 52 by the pump 20. The regulator valve 30 allows passage of the fluid to the tested system 10 until a pressure limit set in the regulator valve 30 is reached. The fluid is then diverted to the reservoir 40 and recirculates to the inlet 24 of the pump 20. The continued flow of fluid from the fluid source 52 can fill the reservoir 40.

It is sometimes preferable to adjust the level of the fluid in the reservoir 40 to an easily readable starting level 43 in a level indicator, such as a vertical, graduated window 42. If the level is to be raised, the inlet valve 50 remains open until the desired starting level 43 is obtained. If the level is to be lowered, the inlet valve 50 is closed before releasing fluid from the testing apparatus according to a method discussed more fully below. In any event, the inlet valve 50 is closed prior to the commencement of the testing period.

When a desired starting level 43 is obtained in the reservoir 40, the timing of the hydrodynamic testing period is started. As fluid in the tested system 10 is lost due to leakage, the pump 20 recharges the tested system 10 to the pressure limit with fluid from the reservoir 40. Correspondingly, the level in the reservoir 40 is reduced proportionally to the volume of fluid lost through leaks in the tested system 10. At the end of the timed testing period, the drop in fluid level in the reservoir 40 can be measured to determine the volume of fluid leaked during the timed testing period.

Air receiving and releasing means, such as a relief valve 46, automatically permits the intake of air to the reservoir 40 as the fluid volume in the reservoir 40 is reduced. This air intake prevents inaccuracies due to a vacuum in the reservoir 40. The air receiving and releasing means is discussed more fully below.

During the recirculation of fluid in the testing apparatus, the fluid flow through the various components of the testing apparatus generates heat. Some testing standards set by municipal ordinances or similar regulations specify relatively extended testing periods. Prolonged recirculation and pump operation during these testing periods can generate sufficient heat to cause inaccuracies in the reservoir level measurements and damage to the testing apparatus. The effects of heating are particularly acute in testing apparatus using relatively small volumes of fluid. To dissipate this heat, cooling means, such as a radiator 60, can be connected to the testing apparatus. Preferably, the radiator 60 is connected to a conduit of the reservoir loop to remove heat from the passing fluid.

In a preferred embodiment of the invention, the testing apparatus additionally includes a system valve 54 connected to the system outlet 34 of the regulator valve 30 for temporarily blocking the flow of fluid from the testing apparatus to the tested system 10. A pressure measuring device, such as a pressure gauge 12, measures the pressure in the tested system 10.

With these additional components, the testing apparatus of the invention can be used to hydrostatically detect and measure the leakage in the tested system 10. In the hydrostatic testing method, the tested system 10 is charged to the predetermined pressure limit by the pump 20. When the pressure limit is reached in the tested system 10, as indicated on the pressure gauge 12, the system valve 54 is closed to prevent further intake of fluid from the testing apparatus and to prevent loss of fluid from the tested system 10 back to the testing apparatus. Simultaneously, the timing of the testing period is started.

As discussed above for the hydrodynamic testing method, the starting level 43 can be adjusted to an easily readable position on the window 42. If the starting level 43 is to be lowered, the inlet valve 50 is closed, and fluid is released from the testing apparatus. If the level is to be raised, the inlet valve 50 remains open until the desired level is achieved, and then closed for the duration of the testing period.

The pump 20 can be deactivated during a substantial portion of the timed testing period. Alternatively, the pump 20 can continue to operate for a relatively short period to allow air to escape from the regulator 30 and associated lines and collect in the reservoir 40.

At some time prior to the expansion of the testing period, the pump 20 can be restarted while the inlet valve 50 remains closed. This preferred step allows the pump 20 to reach a steady condition of operation and recirculation with the reservoir 40.

When the testing period has elapsed, the system valve 54 is reopened, allowing fluid from the testing apparatus to recharge the tested system 10 to the original pressure limit set at the beginning of the testing period. The corresponding drop in fluid level in the reservoir 40 to a post test level 44 can then be measured to determine the fluid lost in the tested system 10 during the testing period.

The preferred embodiment of the testing apparatus also enables a third method of qualitative leakage detection to be performed. In this third method, the tested system 10 is charged to the pressure limit by the pump 20. When the pressure limit is reached, the system valve 54 is closed, and the pressure level indicated on the pressure gauge 12 is noted. After the expiration of the timed testing period, the pressure level is read from the pressure gauge 12. A pressure drop on the pressure gauge 12 indicates the presence of leakage in the tested system 10. Correspondingly, an indication of maintained pressure on the pressure gauge 12 can represent little or no leakage and can avoid the additional time and expense of recharging the system 10 to determine that no quantity of fluid has been lost during the testing period when no leakage has occurred.

The reservoir 40 can have an open top to allow passage of air to the testing apparatus as the reservoir fluid level varies. However, such an open top can permit the intake of debris and other foreign substances, which can clog the testing apparatus or affect the accuracy of the level measurement in the reservoir 40. Thus, the reservoir structure is preferably closed to prevent the introduction of foreign matter. When this preferred reservoir embodiment is used, means for receiving and releasing air to the reservoir 40 should be provided to maintain the accuracy of the level measurements.

Such air receiving and releasing means is preferably a relief valve 46 disposed on a top portion of the reservoir 40. The relief valve 46 automatically permits the intake of air to prevent a vacuum in the reservoir 40 when fluid is drained for recharging the fluid system 10 or adjusting the starting level 43. The relief valve 46 can be manually activated to release trapped, pressurized air when the reservoir 40 is filled to a desired starting level 43. Alternatively, the air receiving and releasing means can be a stopcock, which is manually activated for both releasing and receiving air.

As briefly discussed above, another advantage of the preferred embodiment resides in the ability to set a desired starting fluid level 43 in the reservoir 40 without affecting the accuracy of the testing apparatus and methods. Preferably, the enclosed reservoir 40 has the relief valve 46 on a top surface and fluid release means, such as stopcock 48, on a lower surface.

To raise the reservoir fluid level to a desired starting level 43, the relief valve 46 can be activated to release trapped air as additional fluid is introduced from the fluid source 52. To lower the level, the inlet valve 50 is closed, and the lower stopcock 48 can be used to release fluid from the reservoir 40. Alternatively, a system pressure relief valve 14 connected to the tested system 10 can be activated to release fluid from the tested system 10, thereby causing a requirement of fluid from the testing apparatus and a corresponding drop in the reservoir fluid level.

Although the description of the invention has been given with reference to particular embodiments, this description is not to be construed as limiting the scope of this invention. Many variations and modifications can now occur to those skilled in the art in view of this disclosure. Accordingly, the scope of the present invention should not be determined by the above description, but rather, by a reasonable interpretation of the appended claims.

What is claimed is:

1. Fluid testing apparatus for detecting and measuring leakage in a tested fluid system, comprising:
    a pump having an inlet and an outlet;
    a regulator valve having a regulator inlet connected to the outlet of the pump, said regulator valve being a pressure relief valve, said regulator valve having a bypass outlet and a system outlet;
    a reservoir having a first conduit connected to the inlet of the pump and a second conduit connected to the bypass outlet of the regulator valve, said reservoir having means for indicating a level of fluid in the reservoir;
    an inlet valve connected to the inlet of the fluid pump and the first conduit of the reservoir for controlling the input of fluid from a fluid source to the pump;
    wherein the regulator valve allows passage of fluid from the pump outlet to the tested fluid system until a predetermined pressure limit is reached in the tested fluid system and wherein the regulator valve diverts the fluid from the pump outlet to the reservoir when the pressure limit is reached;
    wherein a starting fluid level is achieved in the reservoir when the inlet valve is closed and wherein a level of fluid in the reservoir falls from the starting fluid level when fluid loss occurs in the tested fluid system.

2. The testing apparatus of claim 1, further comprising a system valve for temporarily preventing fluid flow from the testing apparatus to the tested fluid system and for temporarily preventing loss of fluid from the tested system back to the testing apparatus, said system valve being connected to the system outlet of the regulator valve, and pressure measuring means for indicating fluid pressure in the tested fluid system.

3. The testing apparatus of claim 1, wherein the reservoir is a closed structure.

4. The testing apparatus of claim 3, wherein the reservoir includes air receiving and releasing means.

5. The testing apparatus of claim 4, wherein the air receiving and releasing means is a relief valve which automatically permits intake of air into the reservoir.

6. The testing apparatus of claim 4, wherein the air receiving and releasing means is a stopcock.

7. The testing apparatus of claim 3, wherein the reservoir includes fluid release means for releasing fluid from the reservoir.

8. The testing apparatus of claim 7, wherein the fluid release means is a stopcock.

9. The testing apparatus of claim 1, wherein the pressure limit of the regulator valve is field adjustable.

10. The testing apparatus of claim 1, wherein the pressure limit of the regulator valve is fixed.

11. The testing apparatus of claim 1, further comprising an inlet filter connected between the inlet valve and the pump inlet, said inlet filter being connected to the first conduit of the reservoir.

12. The testing apparatus of claim 1, further comprising cooling means for removing heat from fluid in the testing apparatus.

13. The testing apparatus of claim 12, wherein the cooling means is a radiator connected to the first reservoir conduit.

14. Fluid testing apparatus for detecting and measuring leakage in a tested fluid system, comprising:
a pump having an inlet and an outlet;
a regulator valve having a regulator inlet connected to the outlet of the pump, said regulator valve being an unloader type valve, said regulator valve having a bypass outlet and a system outlet;
a reservoir having a first conduit connected to the inlet of the pump and a second conduit connected to the bypass outlet of the regulator valve, said reservoir having means for indicating a level of fluid in the reservoir;
an inlet valve connected to the inlet of the fluid pump and the first conduit of the reservoir for controlling the input of fluid from a fluid source to the pump;
wherein the regulator valve allows passage of fluid from the pump outlet to the tested fluid system until a predetermined pressure limit is reached in the tested fluid system and wherein the regulator valve diverts the fluid from the pump outlet to the reservoir when the pressure limit is reached;
wherein a starting fluid level is achieved in the reservoir when the inlet valve is closed and wherein a level of fluid in the reservoir falls from the starting fluid level when fluid loss occurs in the tested fluid system.

15. A method for measuring leakage in a tested fluid system, comprising the steps of:
charging the fluid system with fluid from a fluid source to a predetermined pressure limit, using a pump;
diverting the fluid to a reservoir when the fluid system is charged to the predetermined pressure limit;
recirculating the diverted fluid to the inlet of the charging pump;
preventing further input of fluid from the fluid source to the pump;
measuring a starting level of fluid in the reservoir at the beginning of a predetermined testing period;
recharging the fluid system with fluid from the reservoir when pressure of the fluid system falls below the predetermined pressure limit;
measuring a lower level of fluid in the reservoir at the expiration of the testing period.

16. The method according to claim 15, further comprising the steps of:
before preventing further input of fluid from the fluid source to the pump, raising a level of fluid in the reservoir to a desired starting level.

17. The method according to claim 15, further comprising the steps of:
after preventing further input of fluid from the fluid source to the pump, lowering a level of fluid in the reservoir to a desired starting level.

18. A method for measuring leakage in a tested fluid system, comprising the steps of:
charging the fluid system with fluid from a fluid source to a predetermined pressure limit, using a pump;
diverting the fluid to a reservoir when the fluid system is charged to the predetermined pressure limit;
recirculating the diverted fluid to a inlet of the charging pump;
temporarily preventing further input of fluid from the pump to the fluid system;
preventing further input of fluid from the fluid source to the pump;
measuring a starting level of fluid in the reservoir at the beginning of a predetermined testing period;
recharging the fluid system to the predetermined pressure limit with fluid from the reservoir after a predetermined testing period elapses;
measuring a lower level of fluid in the reservoir when the fluid system pressure reaches the predetermined pressure limit.

19. The method according to claim 18, further comprising the steps of:
before preventing further input of fluid from the fluid source to the pump, raising a level of fluid in the reservoir to a desired starting level.

20. The method according to claim 18, further comprising the steps of:
after preventing further input of fluid from the fluid source to the pump, lowering a level of fluid in the reservoir to a desired starting level.

* * * * *